US010665250B2

(12) United States Patent
Sheaffer et al.

(10) Patent No.: US 10,665,250 B2
(45) Date of Patent: May 26, 2020

(54) REAL-TIME FEEDBACK DURING AUDIO RECORDING, AND RELATED DEVICES AND SYSTEMS

(71) Applicant: Apple Inc., Cupertino, CA (US)

(72) Inventors: Jonathan D. Sheaffer, Santa Clara, CA (US); Peter A. Raffensperger, Cupertino, CA (US); Ashrith Deshpande, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,138

(22) Filed: Sep. 28, 2018

(65) Prior Publication Data

US 2020/0105291 A1 Apr. 2, 2020

(51) Int. Cl.
| | |
|---|---|
| *G06F 3/16* | (2006.01) |
| *G10L 21/10* | (2013.01) |
| *G06F 3/0481* | (2013.01) |
| *H04R 3/10* | (2006.01) |
| *G06F 9/54* | (2006.01) |

(52) U.S. Cl.
CPC ............ *G10L 21/10* (2013.01); *G06F 3/0481* (2013.01); *G06F 3/167* (2013.01); *G06F 9/542* (2013.01); *H04R 3/10* (2013.01)

(58) Field of Classification Search
CPC ....... G10L 21/10; G06F 3/0481; G06F 3/167; G06F 9/542; H04R 3/10; H04R 5/04
USPC .......... 700/94; 381/56–58; 702/81, 103, 104, 702/116, 182
See application file for complete search history.

(56) References Cited

U.S. PATENT DOCUMENTS

| | | | |
|---|---|---|---|
| 6,728,680 B1 | 4/2004 | Aaron et al. | |
| 8,006,195 B1 | 8/2011 | Woodings et al. | |
| 2011/0317848 A1* | 12/2011 | Ivanov | H04R 3/005 381/94.2 |
| 2012/0128160 A1 | 5/2012 | Kim et al. | |
| 2013/0156204 A1 | 6/2013 | Schulz | |
| 2015/0304786 A1* | 10/2015 | Partio | H04R 25/305 381/58 |
| 2017/0188167 A1* | 6/2017 | Li | H04R 29/004 |
| 2019/0007780 A1 | 1/2019 | Sheaffer et al. | |
| 2019/0104359 A1 | 4/2019 | Sheaffer et al. | |

* cited by examiner

*Primary Examiner* — Walter F Briney, III
(74) *Attorney, Agent, or Firm* — Ganz Pollard, LLC

(57) ABSTRACT

An audio appliance can include a microphone transducer configured to receive sound from an environment and to convert the received sound into an audio signal and a display. The audio appliance can include an audio analytics module configured to detect an audio-input impairment by analyzing the audio signal and output a detection signal identifying the audio-input impairment in real-time. The audio-input impairment can include, for example, a poor-intelligibility impairment, a microphone-occlusion impairment, a handling-noise impairment, a wind-noise impairment, or a distortion impairment. The audio appliance can also include an impairment module configured to identify and emit a user-perceptible alert corresponding to the identified audio-input impairment in real-time; and an interactive guidance module configured to present a suggested action to address the audio-input impairment in real-time. Related aspects also are described.

22 Claims, 12 Drawing Sheets

REAL-TIME FEEDBACK DURING AUDIO RECORDING, AND RELATED DEVICES AND SYSTEMS

FIELD

This application and related subject matter (collectively referred to as the "disclosure") generally concern audio signal processing, and related systems and methods. More particularly, but not exclusively, this disclosure pertains to systems, devices, and methods for providing real-time feedback to a user during audio recording, and more particularly but not exclusively, to providing feedback responsive to detecting an impairment to an audio signal.

BACKGROUND INFORMATION

Many portable electronic devices such as, for example, smart phones and tablet computers are capable of recording audio data using integrated microphone transducers. Audio recordings may be made independently or in conjunction with another function, e.g., recording video data, recording user gesture data, or, more generally, in conjunction with processing any selected class of computer-executable instructions. Such portable electronic devices often include one or more output devices (e.g., a display, a loudspeaker, a haptic output unit) suited for providing a user-detectable alert from the device.

When recording video, a user can readily observe recorded video in real-time and without requiring a separate (e.g., accessory) device. For example, a display on a given device can render a video as it is recorded, allowing the user to identify problems with or impairments to the recorded video in real time. For example, a user can perceive poor lighting, a subject being too close or too far from the camera, excessive vibration, and so on, by glancing at the display.

For audio recordings, however, a user may be unaware of audio impairments and conditions affecting the quality of the sound until listening, after recording, to the recorded audio. Such conditions may include, for example, an occluded or a failed microphone, wind noise across a microphone port, ambient noise or reverberation obscuring a desired audio source, or unintelligble speech or other user utterances. For a scripted or planned recording, a user may have to re-record all or a portion of the impaired audio track. However, impairments to recordings of unscripted or spontaneous audio sources may render the audio data unuseable, despite that such recordings may be irreplaceable.

SUMMARY

Disclosed systems, devices, and methods provide real-time feedback to a user during audio recording, and more particularly but not exclusively, provide feedback responsive to detecting an impairment to an audio signal. For example, disclosed principles provide real-time detection of conditions that may affect audio quality, e.g., while audio data is being recorded. According to an aspect, user detectable feedback can alert the user to the condition so that the user can take corrective measures to improve perceptual quality of the recorded audio. As one example, an interactive guidance component may prompt or suggest specific measures for the user to take. Disclosed systems, devices, and methods overcome many problems in the prior art and address one or more of the aforementioned or other needs.

In some respects, concepts disclosed here generally concern apparatuses having an audio input device or a microphone transducer, a processor, and a memory. The memory contains instructions that, when executed by the processor, cause the apparatus to initiate an audio recording responsive to a selected input; and convert sound received at the microphone transducer or audio-input device to an electrical audio-input signal. The memory contains instructions that, when executed by the processor, cause the apparatus to monitor a measure of perceptual sound quality of the audio-input signal with respect to a corresponding threshold sound quality in real-time. By way of example, a measure of perceptual sound quality may include speech intelligibility, input levels, and/or noise levels. The memory contains instructions that, when executed by the processor, cause the apparatus to emit a user-perceptible alert responsive to the measure of perceptual sound quality passing the corresponding threshold sound quality in real-time; and modify the user-perceptible alert when the measure of perceptual sound quality changes.

The apparatus may have output means, for example, a display, an audio output device, or a haptic actuator. The user-perceptible alert may be emitted via one or more of the output means, e.g., visually on a display, auditorily via an audio output, or vibrations via the haptic actuator.

The memory may further include instructions that, when executed by the processor, cause the apparatus to detect an impairment in the audio-input signal in real-time when the measure of perceptual quality passes the corresponding threshold. By way of example, the impairment can include a poor-intelligibility impairment, a microphone-occlusion impairment, a handling-noise impairment, a wind-noise impairment, or a distortion impairment.

The memory may further include instructions that, when executed by the processor, cause the apparatus to select and provide interactive guidance according to the identified audio-input impairment. In some cases, further instructions may cause the apparatus to modify the interactive guidance responsive to a change in the impairment. By way of example, the apparatus can analyze the audio-input signal received after the selected interactive guidance is presented and select and present different interactive guidance when the previously identified audio-input impairment is no longer present.

The memory may further include instructions that, when executed by the processor, cause the apparatus to monitor a measure of perceptual sound quality of an intended audio source in the audio-input signal.

In other respects, an audio appliance has a microphone transducer configured to receive sound from an environment and to convert the received sound into an audio signal, and a display.

The audio appliance has an audio analytics module configured to detect an audio-input impairment by analyzing the audio signal and output a detection signal identifying the audio-input impairment in real-time. The audio appliance has an impairment module configured to identify and emit a user-perceptible alert corresponding to the identified audio-input impairment in real-time. The audio appliance has an interactive guidance module configured to provide a user-perceptible output corresponding to the detected audio-input impairment and indicative of a user-implementable action to modify a condition of the audio appliance, in real-time.

In some audio appliances, the audio analytics module has a speech-intelligibility detector configured to detect speech in the audio-input signal, assess speech intelligibility in the detected speech, compare the measured speech intelligibility to a threshold, and output a determination that the detected speech is unintelligible responsive to the assessment. The speech-intelligibility detector may also, or alternatively, output the measure of speech intelligibility or a result of the comparing. By way of example, the user-perceptible output provided by the interactive guidance module may include one or more of a tactile, a visible, and an audible indication to move the electronic device closer to an intended audio source.

In some audio appliances, the audio analytics module has a microphone-occlusion detector configured to detect an input level at a microphone and to output a determination that the microphone is occluded or failed based on the input level. By way of example, the user-perceptible output provided by the interactive guidance module may include one or more of a tactile, a visible, and an audible indication to remove an occlusion from the microphone transducer In some audio appliances, the audio analytics module has a handling-noise detector configured to detect sounds in the audio-input signal caused by a user touching the electronic device and to output a determination that handling noise is present when the sounds are detected. By way of example, the user-perceptible output provided by the interactive guidance module may include one or more of a tactile, a visible, and an audible output.

In some audio appliances, the audio analytics module has a wind-noise detector configured to detect noise on a microphone caused by wind and to output a determination that wind noise is present.

In some audio appliances, the audio analytics module has a level distortion detector configured to detect when an input audio level is above a threshold and to output one of the detected input audio level or a determination that the input audio level is above the threshold. By way of example, the user-perceptible output provided by the interactive guidance module may include one or more of a tactile, a visible, and an audible indication to reduce an input audio level below a threshold audio level.

In some audio appliances, the impairment module has an alert selector configured to receive an output from the audio analytics module, select the user-perceptible alert according to the output from the audio analytics module, and emit the user-perceptible alert. In some audio appliances, the alert selector is further configured to select one of a visual alert, an auditory alert, or a haptic alert.

In some audio appliances, the alert selector is further configured to present a user interface element associated with the selected user-perceptible alert.

In some audio appliances, the alert selector is further configured to present at least one of: an icon presented on the display, a graphic presented on the display, a text-based message presented on the display, an auditory tone output through a speaker of the electronic device, an auditory speech message output through the speaker, a vibration of the electronic device, or a vibration of a wearable electronic device associated with the electronic device.

In some audio appliances, the interactive guidance module is configured to receive the output of the audio analytics module, to select a guidance user interface (UI) element according to the output, and to present the selected guidance UI element to a user.

In some audio appliances, the audio analytics module is configured to detect a change to the audio-input impairment by analyzing the audio signal and output a different detection signal identifying the change. The audio appliance may be further configured to modify the user-perceptible alert responsive to a detected change to the impairment. The audio appliance may be further configured to modify the user-perceptible output responsive to a detected change to the impairment.

In still other respects, methods of identifying audio-input impairments, and providing feedback and interactive user guidance responsive to the identification are disclosed. For example, sound can be received at an audio input device and converted to an electrical audio-input signal. A measure of perceptual sound quality of the audio-input signal can be monitored with respect to a corresponding threshold sound quality while recording the sound to a media file, in real-time. An audio-input impairment that affects the measure of perceptual sound quality can be detected by analyzing the audio-input signal. Interactive guidance responsive to the identified audio-input impairment can be identified and presented in the form of a user-perceptible output to a user on the electronic device. The user-perceptible output may be indicative of a user-implementable action to modify the measure of perceptual sound quality.

Additionally, a user-perceptible alert for the identified audio-input impairment can be identified and emitted to the user on the electronic device. The user-perceptible alert can include, for example, a visual alert, an auditory alert, or a haptic alert. The user-perceptible output can include, for example, a visual output, a tactile output, or an audible output.

The audio-input signal can be analyzed, for example, identify at least one of: a poor-intelligibility impairment, a microphone-occlusion impairment, a handling-noise impairment, a wind-noise impairment, or a distortion impairment.

The user-perceptible output can be changed responsive to a detected change in the audio-input impairment.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figure 1:
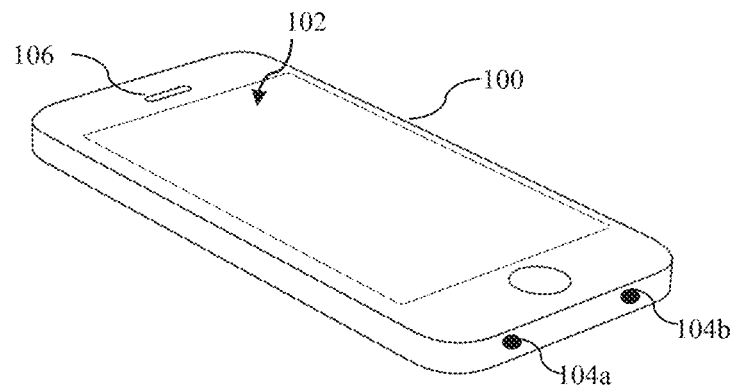
FIG. 1 illustrates a perspective view of an example of a portable electronic device.

Sound recording professionals usually listen in real-time to recorded audio tracks, e.g., to hear audio as it is recorded by a microphone rather than how it sounds live to the ear. For example, a recording studio may be acoustically isolated from an audio source and play recorded audio in real-time within the studio, or a sound engineer may wear headphones to listen to the recorded audio track. By observing recorded audio in real-time and in isolation from the live audio source (i.e., as opposed to directly observing the live audio source), the recording professional can detect impairments to the observed audio source and make appropriate adjustments in real-time.

Although a portable electronic device can provide real-time audio through an audio accessory (e.g., a headphone or an earphone) to isolate the rendered audio from the live audio, known accessories interfere with the user's own observations of the audio source. Accordingly, the average consumer usually does not wear headphones while recording sound or video. And, most portable electronic devices used by consumers do not render audio recordings in real-time as they do with video recordings, as audio emitted by a given device can impair the recording of the live audio source.

Certain software, such as may be used by professional sound recording technicians, can show various measures of audio data quality during a recording and allow equalization and other audio adjustments, e.g., to sound level. However, the average consumer user lacks the training and knowledge, or at least the desire, to use such recording software effectively. For example, the average consumer user may not understand or be able to interpret the information shown about the various measures of audio data quality and may not know when those measures may indicate a problem affecting the perceived quality of the recording. And, particularly for spontaneous audio recordings, the user may not have time to initiate the use of such software, remember to use it, or have headphones or a headset available, which may be needed to use the recording software effectively.

The following describes various principles related to systems, devices, and methods for detecting conditions that may negatively affect (or impair) an audio recording in real time, and guiding a user to addressing the conditions. For example, some disclosed principles pertain to systems, devices and methods to detect conditions such as, for example, unintelligible speech, an occluded or a failed microphone, wind or handling noise, or audio levels that are too high or too low. According to another aspect, some disclosed principles pertain to alerting and/or guiding the user to address an identified condition. As but one illustrative example, a portable electronic device may include an audio analytics module that receives audio data in real time as it is recorded and identifies conditions, in real time, that may affect the quality of the audio data. An impairment module on the device may alert the user to the existence and type of the impairment, and an interactive guidance module may suggest actions that the user can take to improve the audio quality. That said, descriptions herein of specific appliance, apparatus or system configurations, and specific combinations of method acts, are but particular examples of contemplated components, appliances, systems, and are chosen as being convenient illustrative examples of disclosed principles. One or more of the disclosed principles can be incorporated in various other components, appliances, systems, and methods to achieve any of a variety of corresponding, desired characteristics. Thus, a person of ordinary skill in the art, following a review of this disclosure, will appreciate that components, appliances, systems, and methods having attributes that are different from those specific examples discussed herein can embody one or more presently disclosed principles, and can be used in applications not described herein in detail. Such alternative embodiments also fall within the scope of this disclosure.

I. Overview

FIG. 1 shows a perspective view of an example of a portable electronic device 100. A portable electronic device may include, for example and without limitation, a digital audio recorder, a digital video recorder, a handheld computing device such as a smartphone or a tablet computer, a digital camera capable of recording audio and video, a wearable electronic device, a smart speaker, an electronic device capable of voice interaction such as a voice-capable remote control, a laptop computer, or other audio appliance. In the illustrated example, the portable electronic device is a mobile-communications device, sometimes referred to colloquially as a "smartphone."

The portable electronic device 100 may include a display 102. The display 102 may present visual elements to the user of the device, e.g., images, text, user interface elements. When the device 100 includes a camera, the display 102 may present a visual scene observed by the camera, as when the camera is in use.

The device 100 may include one or more microphones, e.g., microphones 104a, 104b. The microphones 104 may be used by a variety of applications, such as, for example, by a telephony application, a video recording application, an audio recording application, and/or by a digital assistant application.

The device 100 may further include a speaker 106. The speaker 106 may output audio signals, for example, and without limitation, from a music player application, from the telephony application, from a video player application, and/or from the digital assistant application.

The device 100 may include other input and output components (not shown), such as, for example, a camera, a light, an actuator to provide a haptic response, and a wired or a wireless communication connection.

Figure 2:
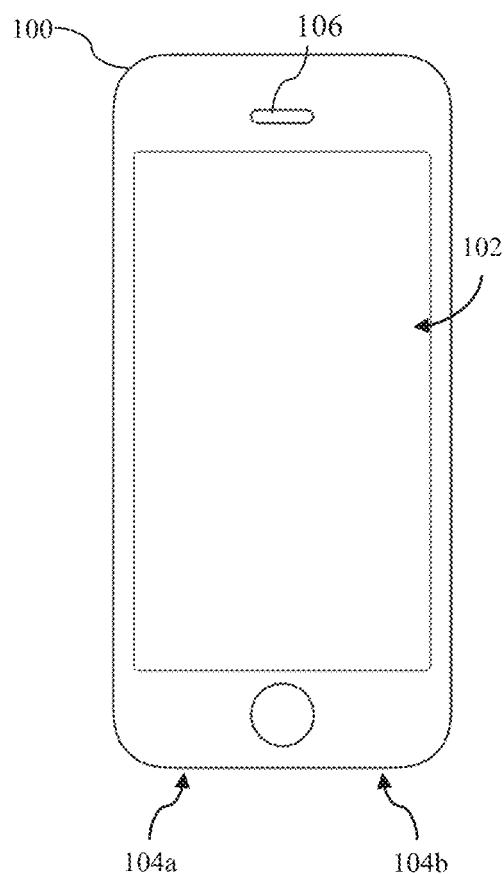
FIG. 2 illustrates a plan view of a front side of the portable electronic device.
Figure 3:
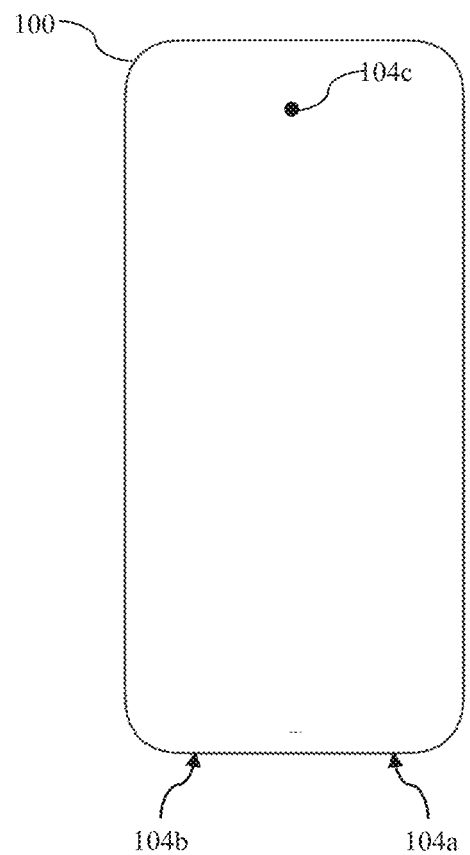
FIG. 3 illustrates a plan view of a back side of the portable electronic device.

FIG. 2 shows a plan view of the front face of the device 100. FIG. 3 shows a plan view of the back face of the device 100. One or more additional microphones may be included on the back face, e.g., microphone 104c, on the side edges of the device (not shown), or any other selected position on the device.

One or more functional components on a portable electronic device can identify any of a variety of conditions that may negatively affect a perceptual quality of recorded audio, in real time, and provide guidance to the user to mitigate the effects of, or eliminate, each such condition. The functional components, e.g., software and/or hardware instructions, may be specific to a recording application on a portable electronic device, or may be available for use by a plurality of applications on the device. In either instance, metadata about recording conditions and acoustic environments may be collected, when authorized. The metadata may reflect information about the acoustic environments where audio and video data are recorded. This metadata may be provided to device designers and manufacturers and may be used to improve, for example, acoustic design of a device, and/or audio signal processing on the device.

Figure 4:
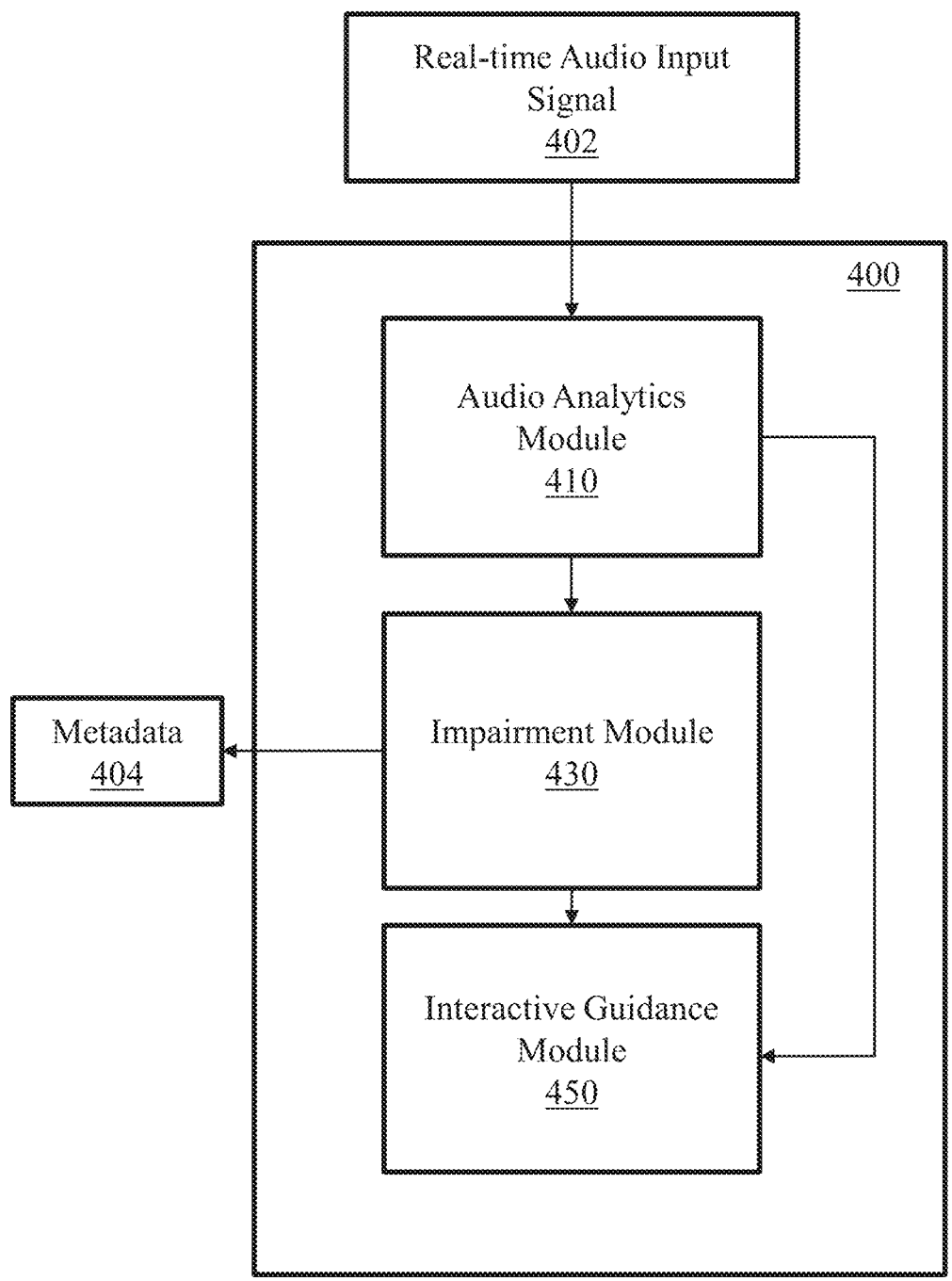
FIG. 4 illustrates a block diagram of an example of functional components of a recording guidance system.

FIG. 4 shows a block diagram of exemplary recording guidance system 400. The illustrated recording guidance system 400 includes several functional components and may be installed on a portable electronic device, e.g., on the device 100. The recording guidance system 400 may receive, record, and process audio signals received through the microphones. The recording guidance system 400 may monitor one or more measures of perceptual quality in the audio signal with respect to one or more corresponding respective thresholds, and identify a condition in the audio signal that may negatively affect the perceptual quality of the recorded audio signal when a threshold is passed, e.g., when a measure exceeds or falls below its corresponding threshold. In some cases, the recording guidance system 400 may monitor a measure of perceptual sound quality of an intended audio source in the audio-input signal while not monitoring other sounds. For example, an intended audio source may include the sound that the user wishes to record, such as, a speaker's voice, music, or an animal noise. The recording guidance system 400 may alert the user to the existence of the condition with information about which condition is identified. The recording guidance system 400 may be a component of a software application, such as an audio recording application. The recording guidance system 400 may be a component of an operating system, or may be a stand-alone application. The recording guidance system 400 may be accessible and useable by a plurality of other software applications.

The recording guidance system 400 may receive a real-time audio-input signal 402. The audio-input signal 402 may be received, for example, through an audio input device on the portable electronic device, or may be received over a communication connection with another electronic device. The audio input device may include, for example, one or more microphone transducers integrated into the portable electronic device, and/or one or more external microphone transducers communicatively coupled to the portable electronic device, or an audio appliance that includes one or more microphone transducers. External microphones may include wired and wireless microphone transducers, and audio accessories, e.g., headphones or earbuds, that include a microphone transducer and a communication connection to transmit audio data to, e.g., the portable electronic device 400, as the audio-input signal 402.

The real-time audio-input signal 402 may be received during a recording operation, for example, when an audio recording application is being used to record audio data, independently or in conjunction with recording video using a camera on the portable electronic device. The real-time audio-input signal 402 may also be received by a portable electronic device absent a user-initiated recording operation, for example, when the portable electronic device is a smart speaker, or includes a digital assistant application that listens for audio commands from a user. The real-time audio-input signal 402 may also be received from a separate device having a microphone, such as, for example, a voice-capable remote control.

The real-time audio-input signal 402 may be input to an audio analytics module 410. The audio analytics module 410 may analyze the audio-input signal 402 and evaluate any of a variety of aspects of the audio data to detect or identify one or more conditions in the audio data. For example, the audio analytics module 410 may monitor a measure of perceptual sound quality in the audio-input signal as the signal is received. When the measure passes a threshold, e.g. falls below or exceeds, the audio analytics module 410 may identify an impairment in the audio-input signal. The audio analytics module 410 may quantify each evaluated aspect, or any of them in combination, or otherwise generate an aggregate score to reflect an overall measure of perceptual quality for the audio-input signal 402.

The audio analytics module 410 may output a detection signal when a condition is identified. When multiple conditions are identified, a separate detection signal may be output for each respective identified condition. In the absence of any detection signals, the impairment module 430, the interactive guidance module 450, or both, may be bypassed or otherwise not invoked.

The audio analytics module 410 may pass any identified impairments, the aggregate score, or both, to the impairment module 430. The impairment module 430 may select one or more feedback mechanisms based on each identified impairment, the aggregate score, or a combination thereof. When user action may be useful to improve the perceptual quality of the audio data, the impairment module 430 may cause the interactive guidance module 450 to guide the user towards the improvement action using the selected feedback. In some cases, the impairment module 430 may cause the portable electronic device to correct for the impairment without user input. For example, the impairment module 430 may perform signal processing, such as, e.g., echo cancellation, equalization, or noise suppression.

The impairment module 430 may generate and/or store metadata 404 about the audio data. The metadata 404 may include information about any detected audio-input impairments, measurements of various aspects of the audio-input signal, location data, local weather conditions at the time of recording, environment information (e.g., inside or outside environment), and/or any other suitable information that may affect or be related to the perceived quality of the recorded audio data. The metadata 404 may be useable by a plurality of applications that have access to the microphones on the portable electronic device, in addition to any system-level or OEM-provided recording applications, and may also be provided to device manufacturers. The metadata 404 may be generated, stored, or both, even when no audio-input impairments are detected and the impairment module 430 is not invoked to provide feedback.

The interactive guidance module 450 may use various aspects of a user interface of the portable electronic device to guide the user to take corrective measures. For example, the interactive guidance module 450 may use visual alerts on a display, audio alerts such as a warning tone or text-to-speech spoken instruction, or haptic alerts such as a vibration of the portable electronic device itself or of a wearable device communicatively coupled to the portable electronic device. When an audible alert or a haptic alert that could further impair the recorded audio-input signal is used to alert a user, the impairment module 430 may include additional signal processing modules to cancel or suppress the audible or haptic impairment within the audio-input signal 402.

More, fewer, or other functional modules may be used to provide the operations discussed herein, and some of the modules described may be combined into one module. A more detailed discussion of the functional aspects and related principles follows.

II. Audio Quality Impairment Detection System

Figure 5:
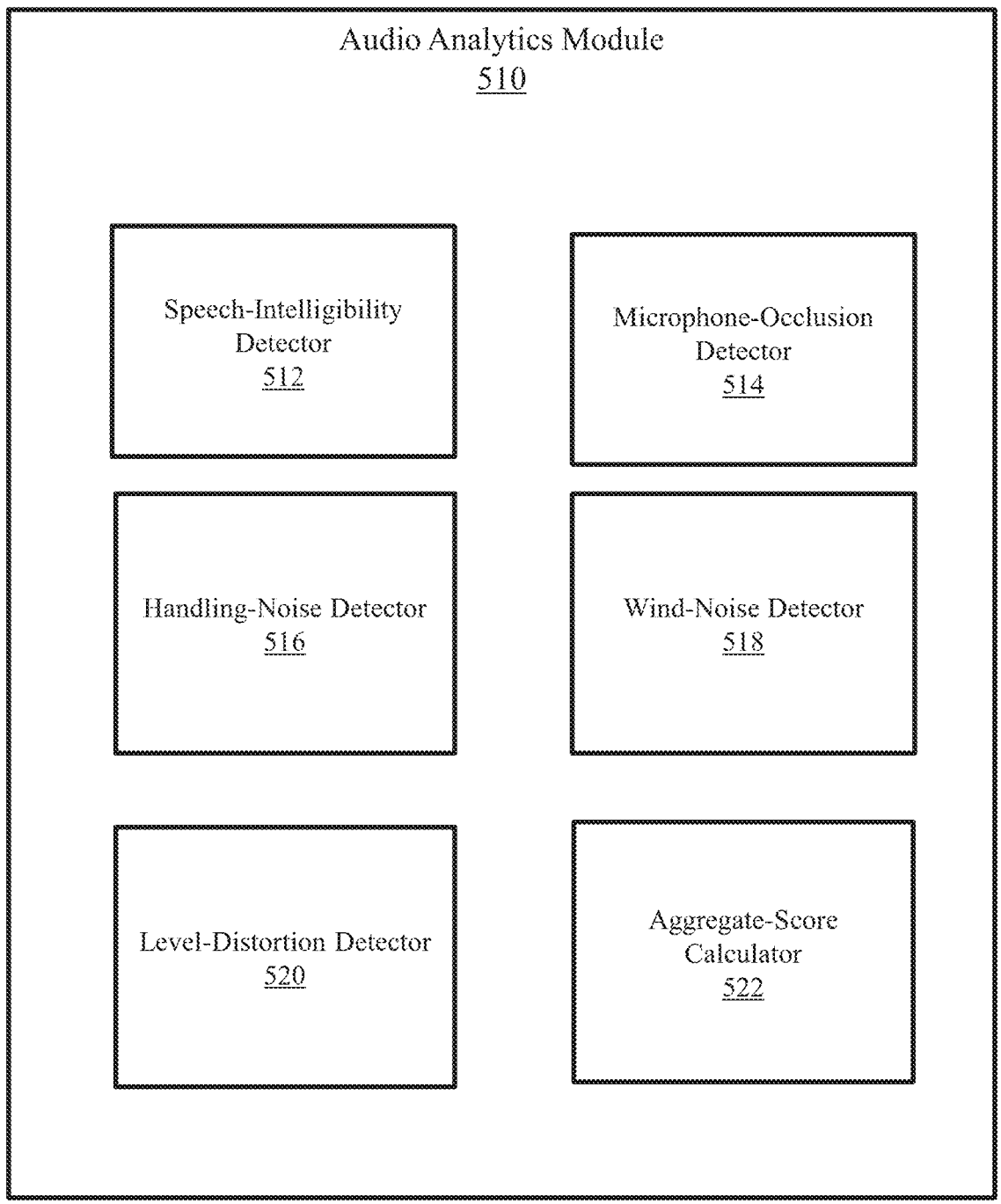
FIG. 5 illustrates a block diagram of an example of an audio analytics module.

FIG. 5 shows a block diagram of an example of an audio analytics module 510. The audio analytics module 510 may be a representative example of the audio analytics module 410. The audio analytics module 510 may include any of various functional components used to identify impairments in audio data.

The audio analytics module 510 may include, for example, a speech-intelligibility detector 512. The speech-intelligibility detector 512 may have, or have access to, a voice activity detector that detects utterances in an audio-input signal. When a voiced or unvoiced utterance is detected, the speech-intelligibility detector 512 may, for example, invoke a speech recognition component to resolve the utterance or otherwise assess a measure of speech intelligibility. For example, the speech-intelligibility detector 512 may determine whether distinct sounds, phonemes, words, phrases, or sentences can be detected or resolved within the audio signal during a period of detected speech. By way of further example, the speech-intelligibility detector 512 may determine a confidence score for any detected sounds, phonemes, words, phrase, or sentences.

The speech intelligibility detector 512 may also or alternatively make use of visual information, for example, from a camera. The speech intelligibility detector 512 may predict an expected level of intelligibility based on the distance between the electronic device and the speaker, as determined by the camera or other component. The expected level of intelligibility may be used a threshold value.

When a measure of speech intelligibility falls below a selected threshold measure of intelligibility, e.g., the expected level of intelligibility or a pre-set value, the speech-intelligibility detector 512 may identify a poor-intelligibility impairment in the audio-input signal. As an example, a representative measure can include the number of detected words within a selected time frame, the confidence score, or both. Further, the speech-intelligibility detector 512 may output, e.g., a detection signal or other data that indicates that unintelligible speech is detected.

The audio analytics module 510 may include a microphone-occlusion detector 514. The microphone-occlusion detector 514 may measure a sound level received from each of one or more microphones integrated with or connected to the portable electronic device. The microphone-occlusion detector 514 may compare the sound input levels and detect that the level from one of the microphones differs from the level from each of the other microphones by more than a threshold value. When recording far-field audio sources, microphones on a hand-held portable electronic device tend to be close together relative to the distance between the device and the audio source. Accordingly, a significant difference between or among input levels of the microphones can indicate that a microphone is occluded, e.g., by the user's finger, (e.g., rather than indicating that the microphone is significantly farther away from the audio source than another microphone). According to another aspect, a microphone-occlusion detector can include a barometer or other physical sensor to detect a condition indicative of an occluded microphone. For example, a local ambient pressure may suddenly increase or remain elevated (or suddenly decrease or remain low). Such an observed pressure condition may indicate that a corresponding microphone port is occluded. According to another aspect, a microphone-occlusion detector may compare other measures of the audio-input signals from the different microphones to detect occlusion. For example, the spectral tilt from each microphone may be compared. The spectral tilt may describe the relationship of the power to the frequency of an audio signal, e.g., the slope of the power spectral density. The spectral tilt of an occluded microphone will differ from the spectral tilts of the non-occluded microphones by at least a threshold value.

In any event, the microphone-occlusion detector 514 may accordingly identify a microphone-occlusion impairment for the audio input. For example, the microphone-occlusion detector 514 may output a detection signal that indicates that a microphone is occluded or failed. The signal may also include information on which microphone is occluded. When no microphones are occluded, the microphone-occlusion detector 514 may output a signal or other data that indicates that there is no occlusion or that all microphones are receiving sound, or simply may not output any signal absent a detected microphone-occlusion impairment.

The audio analytics module 510 may include a handling-noise detector 516. Handling noise may refer to sounds and vibrations that occur as a result of the user's interaction with the device. Handling noise may occur, for example, when a user's finger or article of clothing brushes briefly against a microphone, when the user changes their grip on the device, or when the user taps, touches or presses buttons on the device or user interface elements on touch-sensitive display. The handling-noise detector 516 may detect sounds that correspond to user inputs received on the device, e.g., a tap or press on a hardware button or on a user interface element. The handling-noise detector 516 may detect other sounds that do not correspond to user inputs, but also do not correspond to wind noise, e.g., a fingertip brushing across only one microphone, or a finger tapping on the body of the device. When the handling-noise detector 516 detects the presence of handling noise, the handling-noise detector 516 may compare a level of the handling noise to a handling-noise threshold. When the handling-noise threshold is exceeded, the handling-noise detector 516 may accordingly identify a handling-noise impairment for the audio input. For example, the handling-noise detector 516 may output a detection signal or other data that indicates that a handling-noise impairment has been detected in the audio-input signal. When no handling noise is detected, the handling-noise detector 516 may output a signal or other data that no handling noise has been detected, or simply may not output any signal absent a detected handling noise.

The audio analytics module 510 may include a wind-noise detector 518. The wind-noise detector 518 may detect a presence of, e.g., a low-frequency distortion that shows low correlation among the microphones on the portable electronic device, and/or other distortion characteristics indicative of a presence of audible wind noise. Air moving across a membrane of a microphone can physically deform the membrane, which can induce a low-frequency noise-signal superimposed on the intended audio signal. Each microphone may be affected differently, and so the superimposed noise does not correlate closely among them. When such a low-frequency distortion is detected, the wind-noise detector 518 may identify the presence of wind noise. When the level of wind-noise exceeds a wind-noise threshold, the wind-noise detector 518 may identify a wind-noise impairment in the audio input. For example, the wind-noise detector 518 may output a detection signal or other data that indicates that a wind-noise impairment has been detected. The signal may also indicate a degree (e.g., severity) of distortion. When no wind noise detected, the wind-noise detector 518 may output a signal indicating that no wind noise is detected, or simply may not output any signal absent a detected wind noise.

The audio analytics module 510 may include a level-distortion detector 520. The level-distortion detector 520 may measure the input level of the audio data. When a microphone is too close to a sound source, the audio input level may be too high. When a microphone is too far away from a sound source, the audio input level may be too low relative to a background noise. The level-distortion detector 520 may compare the input level to one or more threshold levels. When the input level exceeds or falls below a threshold, the level distortion detector 520 may identify a distortion impairment in the audio input. For example, the level-distortion detector 520 may output a detection signal that indicates that the input level is too high or that the input level is too low. The detection signal may also indicate by how much the input level is above or below the threshold. When no level distortion is detected, the level distortion detector 520 may output a signal that the input level is within an acceptable range, or may output no signal unless a distortion impairment is detected.

In some cases, the level-distortion detector 520 may measure the input level of the observed audio signal, including all sounds reaching the microphone transducer(s). In other cases, the level-distortion detector 520 may measure an input level of an intended or a desired audio source, e.g., extracted as a component from an observed signal impaired by background noise or another noise source. For example, the level-distortion detector 520 or another component of the audio analytics module 510 can identify one or more selected classes of audio signal (e.g., music, speech, etc.) within an observed signal and isolate audio components corresponding to, e.g., a desired class or desired classes of audio signal. According to an aspect, the level-distortion detector 520 can assess a level of each of the one or more selected classes of audio signal, e.g., in relation to the overall level of the observed signal. Additionally, the level-distortion detector 520 may condition the observed signal or an extracted component of the observed signal, or receive a conditioned signal, e.g., with canceled reverberation or suppressed noise, before measuring or assessing the level of the intended audio source to determine whether there is level distortion.

The audio analytics module 510 may include an aggregate-score calculator 522. The aggregate-score calculator 522 may receive any detection signals output from one or more of the detectors of the audio analytics module 510, at least when an impairment is identified by one of the detectors. The aggregate-score calculator 522 may calculate an aggregate audio-quality score as a function of information in the received detection signals. As described above, the detection signals may include an indication of an identified audio-input impairment, for example, a binary indication of the presence or absence of an impairment. The detection signal may also include values relating to an aspect of the audio-input signal, such as, for example, an indication of a degree of severity of the impairment, a measurement of the input signal, e.g., a level measurement, an intelligibility measurement, or an identifier of an occluded microphone. The detection signal(s) may be input into a function to produce an aggregate score that reflects an overall measure of quality for the received audio input data. For example, the values or indications from the output signals may be added together, averaged, or otherwise combined to calculate the aggregate score. The aggregate score may be in the form of a number, e.g., on a scale of 0 to 1, 1 to 5, 1 to 10, or 1 to 100. The aggregate score may be nominal, e.g., "too much noise", "unsuitable conditions". The aggregate score may be ordinal, e.g., "good", "acceptable", and "poor". The aggregate score may also be time-stamped or marked to align with the audio input data for later processing and/or for use by other software components.

The outputs from the detectors may be weighted by the aggregate-score calculator 522. For example, audio-input impairments that may contribute more to a perception of poor audio quality may be weighted more heavily than those that affect the perceived quality less. For example, a microphone occlusion may affect the perceived quality less than unintelligible speech, particularly in a portable electronic device having multiple microphones.

III. Impairment Alert System

Figure 6:
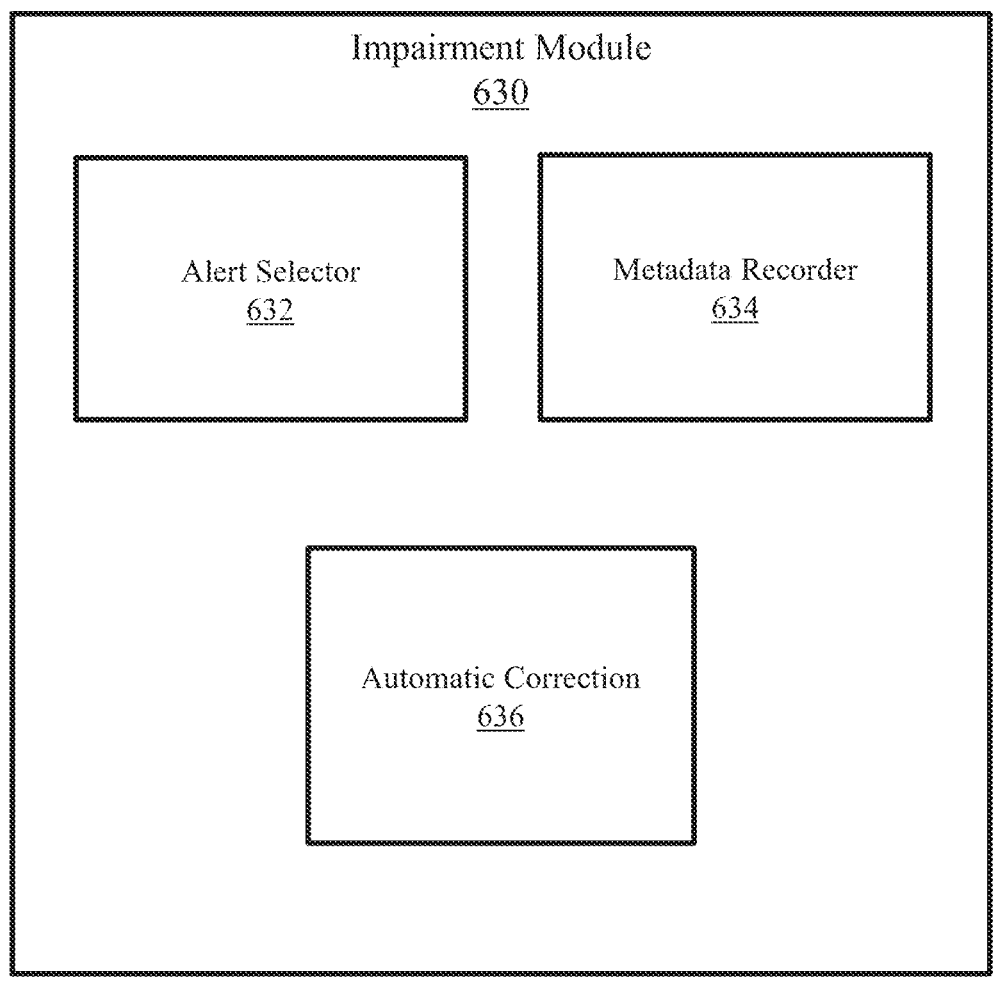
FIG. 6 illustrates a block diagram of an example of an impairment module.

FIG. 6 shows a block diagram of an example of an impairment module 630. The impairment module 630 may be a representative example of the impairment module 430. The impairment module 630 may include various functional components used to notify a user of an identified impairment.

The impairment module 630 may include an alert selector 632. The alert selector 632 may receive the outputs from an audio analytics module, e.g., the one or more identified audio-input impairments. The alert selector 632 may look up an impairment indicator based on the identified impairment(s). For example, each potential impairment may be mapped to one or more impairment indicators.

Figure 7:
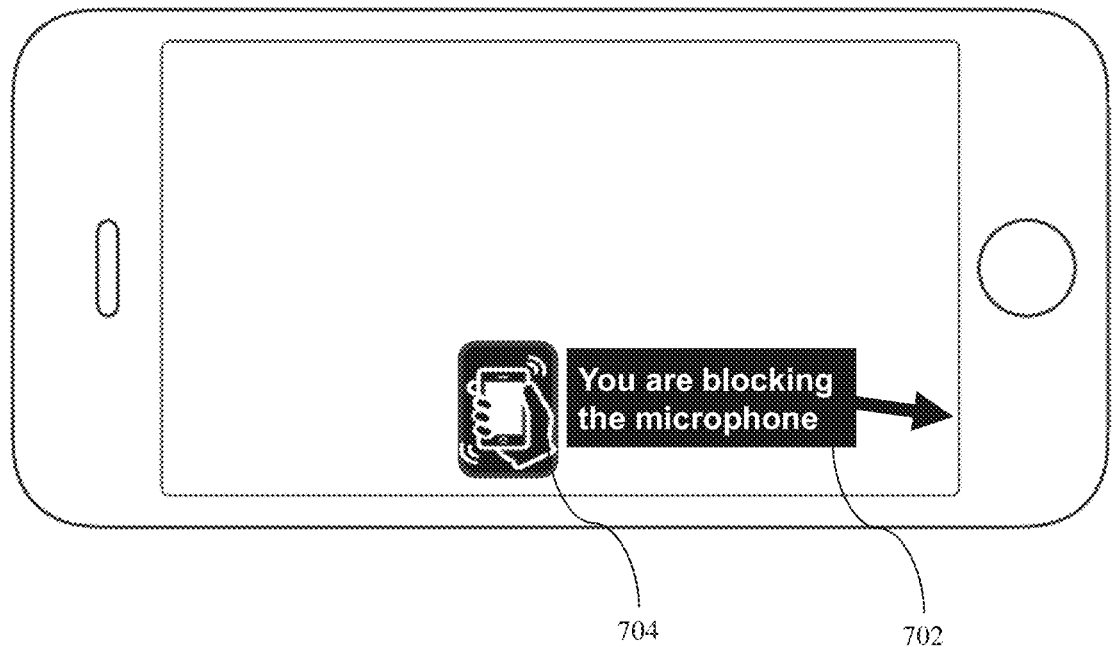
FIG. 7 illustrates an example of a visual impairment indicator.

An impairment indicator may correspond to a user-perceptible alert that, when emitted, alerts the user to the existence of the audio-input impairment, and/or to the specific type of impairment detected. "User-perceptible" as used herein includes outputs on the electronic device, or on connected devices, that can be sensed by a user's nervous system, e.g., seen, heard, or felt. For example, a user-perceptible alert can include a visual indicator, e.g., an icon, a symbol, or a textual message presented on a visual display of the portable electronic device. FIG. 7 shows an example of a visual alert, e.g., impairment indicator 702. For example, if a microphone is occluded, the visual impairment indicator 702 may include an arrow pointing to the occluded microphone, a message that states, "You are blocking the microphone", an alert icon 704, or a combination thereof.

Figure 8:
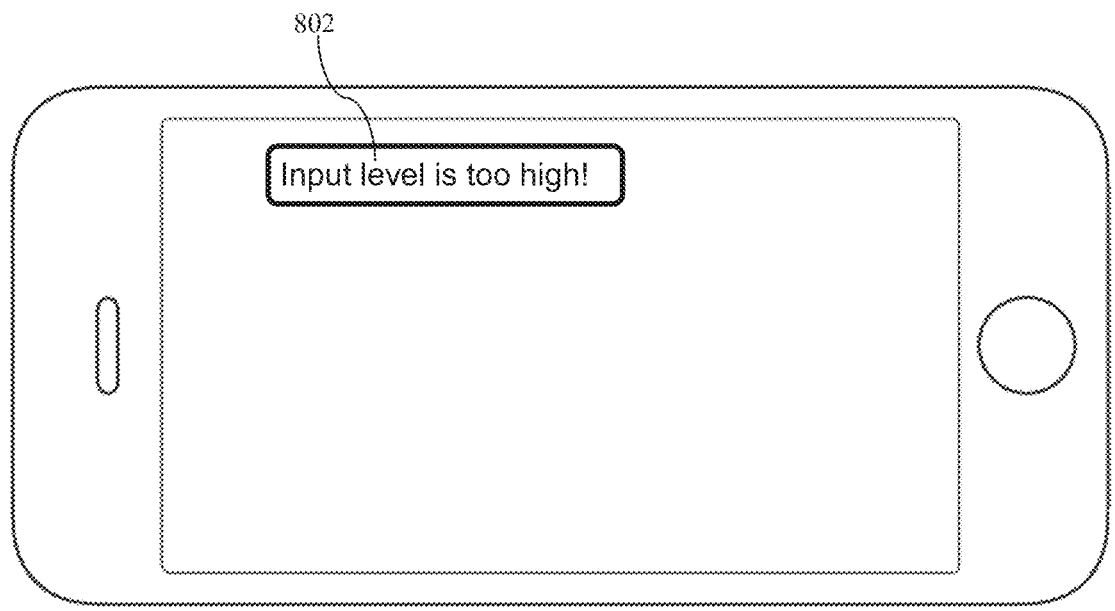
FIG. 8 illustrates a second example of a visual impairment indicator.

FIG. 8 shows a second example of a visual alert, e.g., impairment indicator 802. The impairment indicator 802 may be provided, for example, when the audio input level is too high, such as when the microphone is too close to a sound source.

Figure 9:
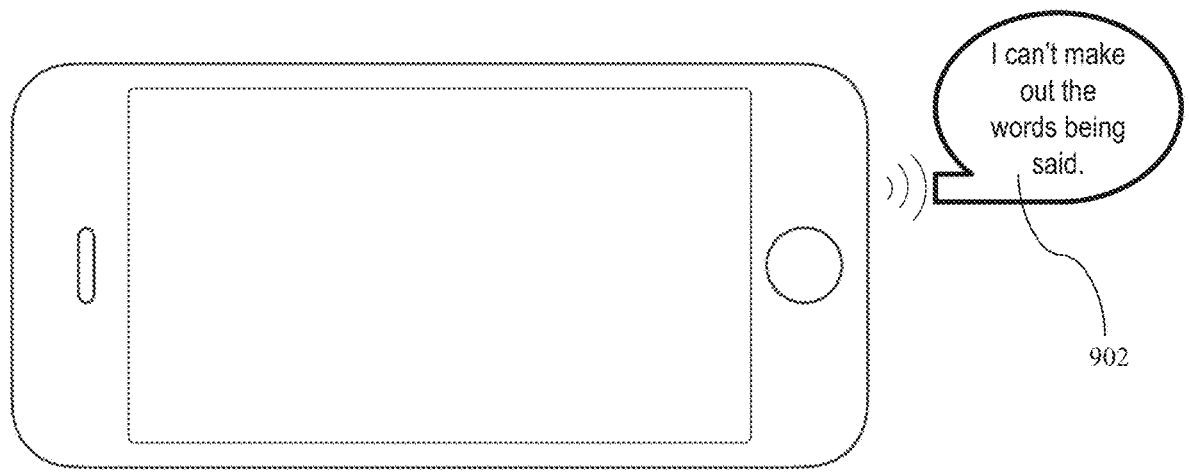
FIG. 9 illustrates an example of an auditory impairment indicator.

A user-perceptible alert may be auditory. FIG. 9 shows an example of an auditory impairment indicator, represented by the speech bubble 902. For example, if low speech intelligibility is detected, a spoken message of "I can't make out the words being said" may be played through a speaker. The auditory alert may be a text-to-speech message, or a pre-recorded audio message played as an audio file. If the portable electronic device includes a digital assistant application, the digital assistant may "speak" an alert, such as "A microphone is blocked". Auditory alerts may include a tone or chime played through a speaker on the portable electronic device, or through a speaker on a connected wearable device.

When an auditory alert is used, additional processing may be used to prevent the auditory alert from being included in the recorded audio data. For example, an echo cancellation process may be used to remove the auditory alert from the recorded audio data.

Figure 10:
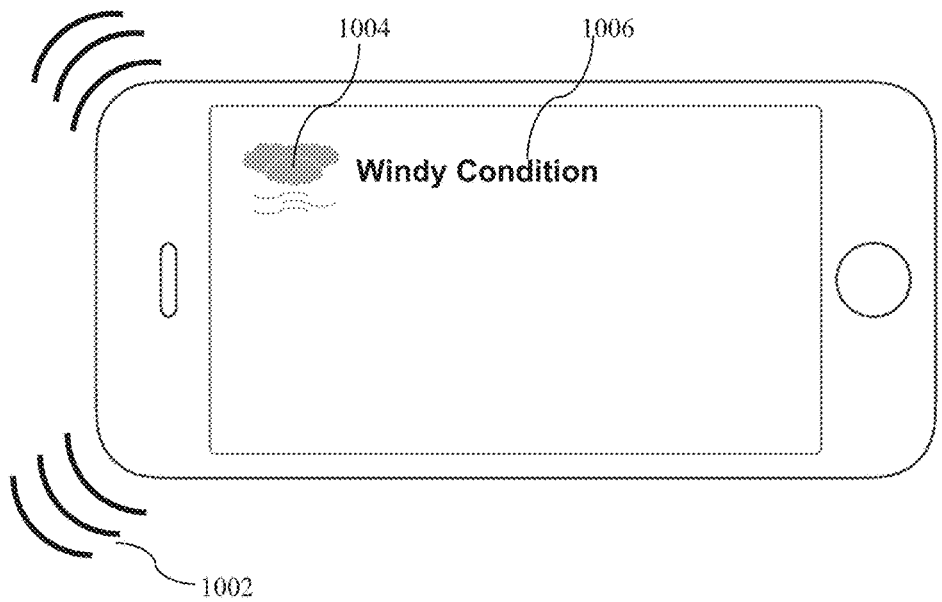
FIG. 10 illustrates an example of a haptic impairment indicator.

A user-perceptible alert may be haptic. For example, the portable electronic device may be made to vibrate or shake to alert a user to an audio-input impairment. FIG. 10 shows an example of a haptic alert as represented by the vibration lines 1002. The haptic response may make the whole device vibrate or shake, or may make a portion of the device shake or vibrate. For example, when a microphone is occluded or being subjected to handling noise, an actuator located near the occluded or handled microphone may be vibrated to indicate the specific affected microphone. When the portable electronic device is communicatively coupled to a wearable device such as a smart watch, the portable electronic device may be made to cause the wearable device to vibrate. In an embodiment, echo cancellation may be used to remove the vibrations of a haptic response from the recorded audio data.

The user-perceptible alert may include a combination of types of responses. For example, as shown in FIG. 10, a haptic alert 1002 and a visual alert may be used simultaneously to alert a user that wind noise is detected. The visual alert may be an icon 1004 or symbol, e.g., representing wind, a textual message 1006, or both.

The impairment module 632 may display or otherwise output the user-perceptible alert continuously until the detected impairment is no longer present. If the user-perceptible alert includes an indication of a degree or measure of the impairment, the impairment module 632 may update or change the user-perceptible alert as the degree or measure of the impairment changes, and may remove the user-perceptible alert, for example, once a corresponding measure no longer passes its respective threshold. In some cases, the user-perceptible alert may be removed in response to a user action, such as a selection of a close button on the alert, or by selecting an "ok" or "cancel" button to dismiss the alert. In still other cases, the user-perceptible alert may be removed after a specified duration of time, such as, e.g., 15 seconds, 30 seconds, even when the impairment is still present.

When permitted by the user, the outputs of the detectors and the aggregate score may be stored as metadata, or anonymized and stored as metadata, by the metadata recorder 634. The metadata may reflect information about the acoustic environments where audio and video data are recorded. This metadata may be provided to device designers and manufacturers and may be used to improve, for example, acoustic design of a device, and/or audio signal processing on the device.

The metadata may be useable by other applications that have access to the microphones on the portable electronic device, in addition to any system-level or OEM-provided recording applications. These other applications may have their own responses to audio impairments when in use, and may provide some or all of their own alerts. For example, if the device has a broken microphone, the recording application may use this information from the metadata to change which audio filter to use, e.g., an audio filter that corresponds to the number of working microphones.

The metadata may be included in or associated with the recorded audio and video data, and may be accessible to other applications. For example, a separate video or audio editing application may use the metadata to suggest which portions of a recording have sufficient quality to use in an editing project.

The metadata may also be used to diagnose problems, and to repair or improve the functionality of other applications that use audio data. A system health application, for example, can use the metadata to learn that a microphone has failed or is consistently occluded, for example, by a decorative or protective case or other after-market object applied to the device. That information may in turn inform the system health application that other functions may not work properly, such as a digital assistant, the telephony software, or other applications that use the microphone.

The impairment module 630 may include an automatic correction component 636. The automatic correction component 636 may correct or adjust for some audio-input impairments without user input. For example, if a microphone is malfunctioning or is occluded, the automatic correction component 636 may disable the microphone. In another example, when wind noise is detected, the automatic correction component 636 may initiate a wind noise adjustment process to reduce the effect of the wind noise on the audio data. When the automatic correction component 636 makes a correction or adjustment, the impairment module 630 may not present any user-perceptible alerts. Alternatively, the impairment module 630 may present an alert that informs the user that a correction or adjustment was applied. The impairment module 630 may inform the user that a correction was applied when the correction or adjustment may affect the quality of the audio recording.

IV. User Guidance System

Figure 11:
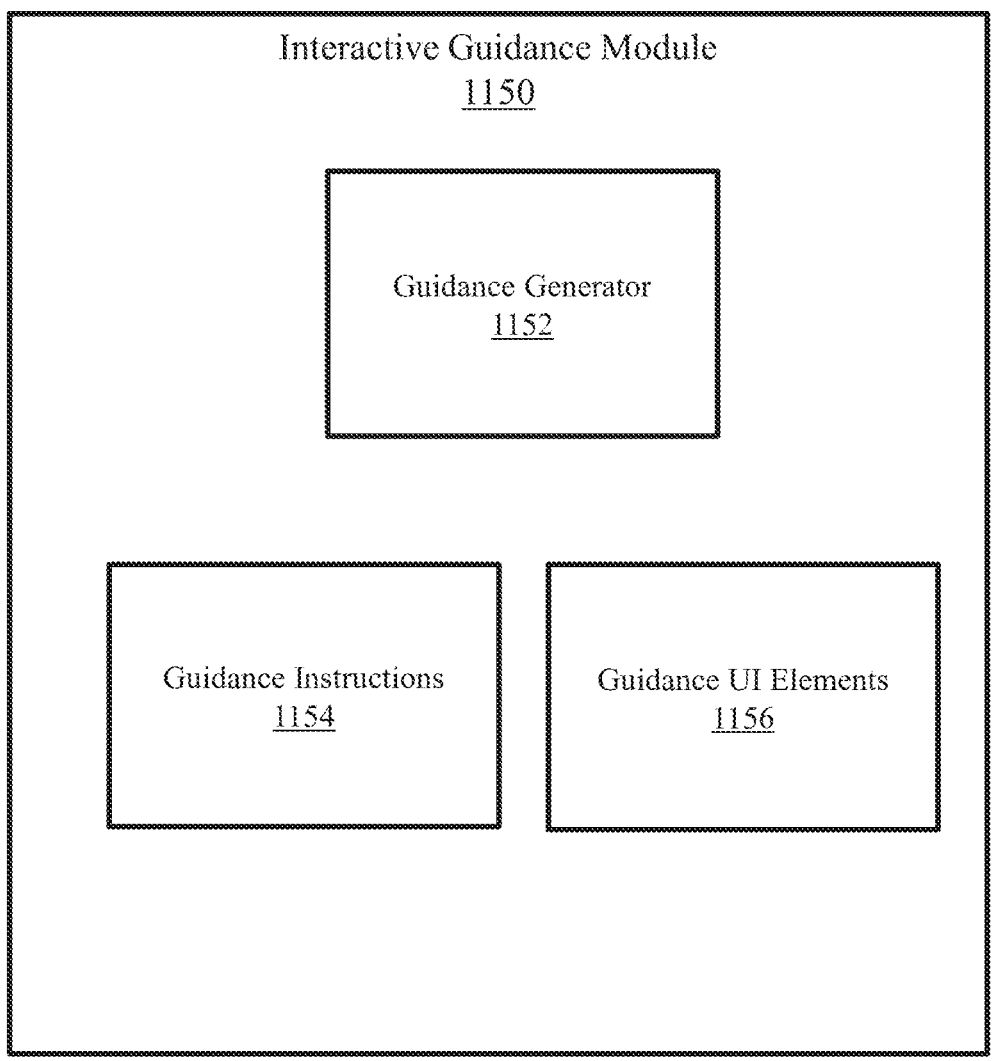
FIG. 11 illustrates a block diagram of an example of an interactive guidance module.

FIG. 11 shows a block diagram of an example of an interactive guidance module 1150. The interactive guidance module 1150 may be a representative example of the interactive guidance module 450. The interactive guidance module 1150 may include any of various functional components to guide a user to change one or more aspects of recording conditions to improve audio quality in a recording.

A guidance generator 1152 may receive a detected audio-input impairment, an aggregate score, or both, when an impairment is detected. The guidance generator 1152 may present guidance, e.g., a suggested action, to the user, which, if followed by the user, may improve the perceived audio quality or reduce or eliminate the effects of the impairment. The guidance generator 1152 may identify guidance instructions 1154 associated with the specific detected impairment. The guidance instructions 1154 may include links or references to guidance user interface (UI) elements 1156 to retrieve, and processes for presenting the guidance UI elements and re-evaluating recording conditions. The guidance instructions 1154 may be, for example, a library, a database, a look-up table, or other data store. The guidance generator 1152 may execute or use the guidance instructions to generate and present the guidance to the user for correcting the impairment affecting the audio data.

The guidance UI elements 1156 may include, for example, visual UI elements such as symbols, icons, overlay text, pop-up windows, or dialog boxes. A visual UI element may include a colored shape having a color correlated to the aggregate score. The colored shape may change color as the audio quality improves or degrades. The guidance UI elements 1156 may also include pre-recorded audio messages, audio tones, or text for use in a text-to-speech output for spoken guidance.

The interactive guidance module 1150 may continue to present interactive guidance while a given audio-input impairment persists. When the impairment is resolved, the interactive guidance module 1150 may present information that the impairment is resolved.

Figure 12A:
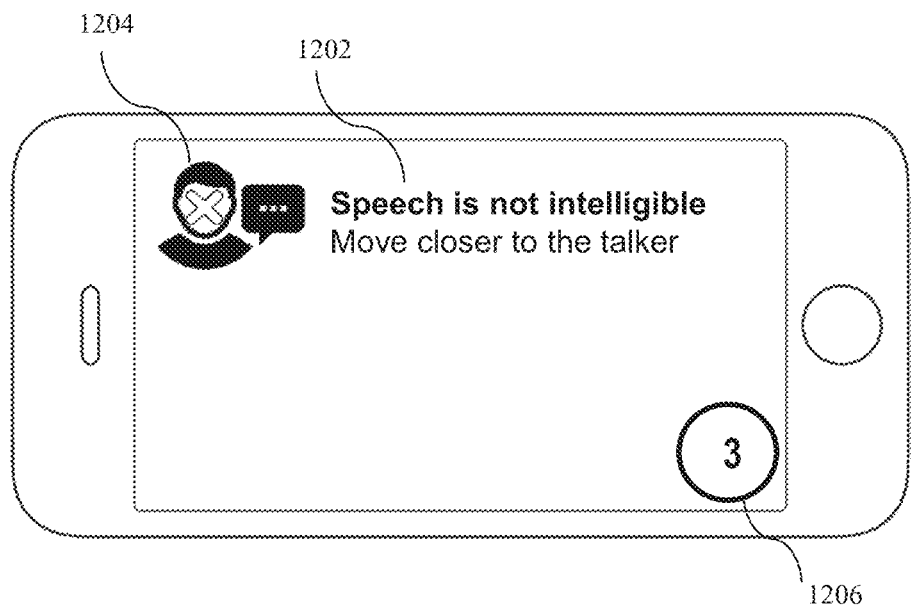
FIGS. 12A-B illustrate an example of user guidance that may be provided when poor speech intelligibility is detected.
Figure 12B:
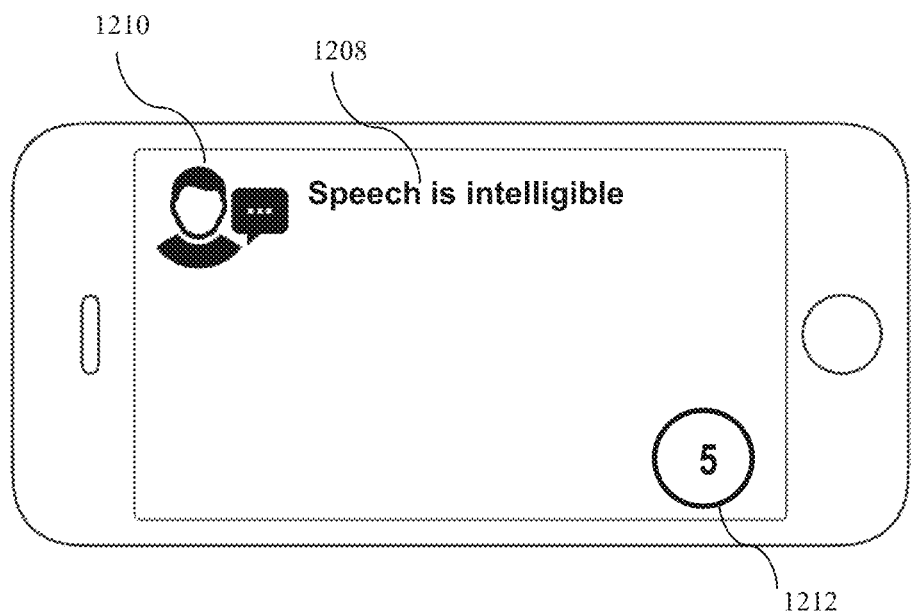

FIGS. 12A-B shows an example of user guidance that may be provided when poor speech intelligibility is detected. For example, the guidance generator 1152 may identify the guidance instructions 1154 associated with the poor speech intelligibility impairment. The guidance instructions may cause the guidance generator 1152 to retrieve one or more guidance user interface (UI) elements 1156, such as a textual message 1202 with an instruction to the user to move closer to the speaker and an alert icon 1204. The guidance generator 1152 may present the guidance UI elements on the display of the device. The guidance generator 1152 may monitor the aggregate score and/or any indications that an impairment is still detected and may continue presenting the guidance UI elements until the aggregate score indicates improved quality and/or until an impairment is no longer detected. The guidance generator 1152 may also display the aggregate score in a UI element 1206, which may be updated as the user implements the guidance.

FIG. 12B shows an example of user guidance after the user has followed the guidance presented in FIG. 12A such that the impairment is resolved. The guidance UI elements may be updated, for example, to a different textual message 1208 and a different alert icon 1210, indicating that the speech is now intelligible. The aggregate score may be improved, and displayed in the UI element 1212. The guidance UI elements may be presented for a relatively limited period of time, e.g., 5, 10, or 15 seconds.

Figure 13:
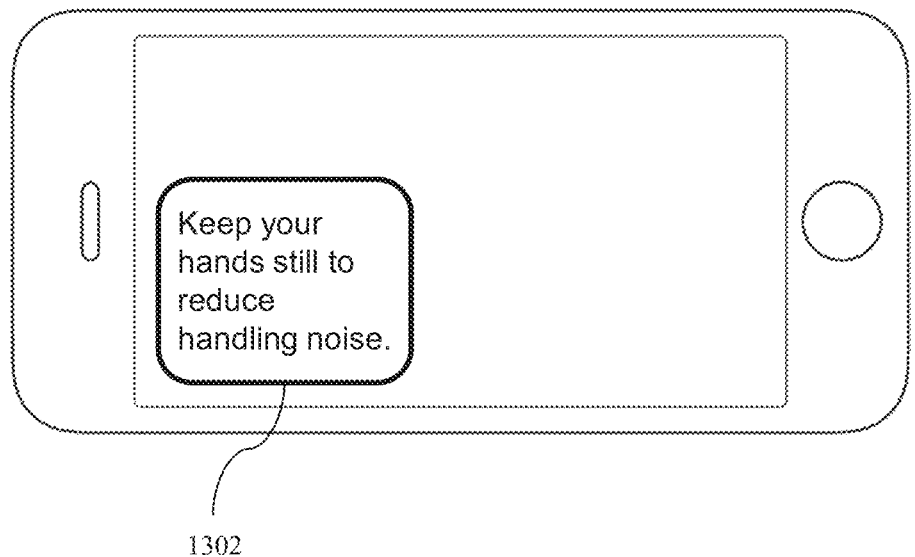
FIG. 13 illustrates an example of user guidance that may be provided when handling noise is detected.

FIG. 13 shows an example of user guidance that may be provided when handling noise is detected. The guidance generator 1152 may identify the guidance instructions 1154 associated with the handling noise impairment. The guidance instructions may cause the guidance generator 1152 to retrieve one or more guidance user interface (UI) elements 1156, such as a textual message 1302 with an instruction to the user to keep their hands still. The guidance generator 1152 may present the guidance UI elements on the display of the device.

When a microphone is occluded, the guidance instructions 1154 associated with the occluded microphone impairment may cause the guidance generator 1152 to present a guidance UI element that includes, for example, an arrow pointing to the occluded microphone, and a textual message to move the obstruction from the indicated microphone. In an embodiment, the guidance generator 1152 may use contextual information to provide more specific guidance. For example, the guidance generator 1152 may use information about the orientation of the electronic device and which microphone is occluded to determine that the user's left hand is occluding the microphone. The guidance UI element may then suggest that the user move their left hand.

When a level-related impairment is detected, the guidance generator 1152 may output an instruction to move the portable electronic device closer to a sound source, when the level is too low. Alternatively, the guidance generator 1152 may output an instruction to move the portable electronic device away from a background sound source, when the level is too low. When the level is too high, the guidance generator 1152 may output an instruction to move the portable electronic device away from the sound source.

Figure 14:
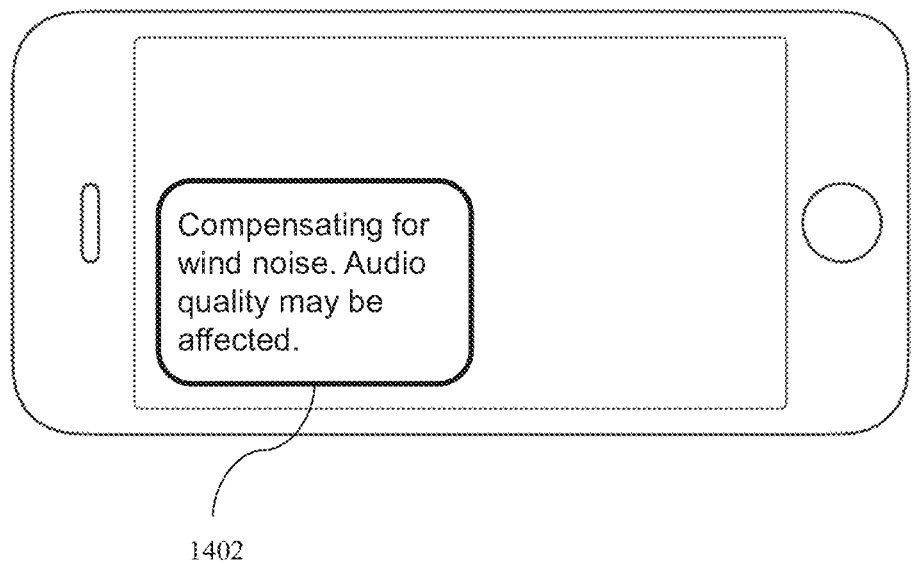
FIG. 14 illustrates an example of user guidance comprising an alert.

As shown in FIG. 14, for impairments that may be beyond the user's control, such as, for example, wind noise, the guidance generator 1152 may present an alert 1402. The alert 1402 may inform the user that the system is compensating for wind noise and that the audio quality may be affected. Alternatively, a wind noise alert may inform the user that wind noise is occurring, without any guidance to correct the impairment. The guidance generator 1152 may present a general suggestion that the user pause the recording until the impairment subsides, if possible.

In some embodiments, the impairment module and the interactive guidance module may be combined such that user guidance is provided with the feedback about the detected audio-input impairment.

V. Post-Recording Adjustments

In some use cases, a user may not be able to follow the guidance to address an impairment, or may choose not to. Post-recording adjustments may still be possible to improve the quality of the audio data. The various audio analytics module detectors may use time stamps or other markers to note when an impairment occurs in the audio input data. The aggregate score may also be similarly stamped or marked to align with the audio input data.

In an embodiment, when a post-recording process is available to improve the audio quality for a noted impairment, the system may make a copy of the affected audio data and may apply the post-recording process to the copy. If multiple processes are available, one may be selected by the system according to the aggregate score and/or the detected impairment for the affected audio. Alternatively, a separate copy for each available process may be made, and each available process may be applied to a separate copy. Still further, additional copies may be made, and combinations of processes may be applied to the additional copies. The user may be presented with the processed copy or copies, and allowed to select from the original audio and the processed audio copies.

Alternatively, suggestions for processing the affected audio data may be presented to the user according to the aggregate score and/or the detected impairment for the affected audio. Once the user selects a process, the system may make a copy of the affected audio, and may apply the process. The user may then review the processed audio and select whether to keep the original audio or the processed audio in the recording.

VI. Logic Flows

Figure 15:
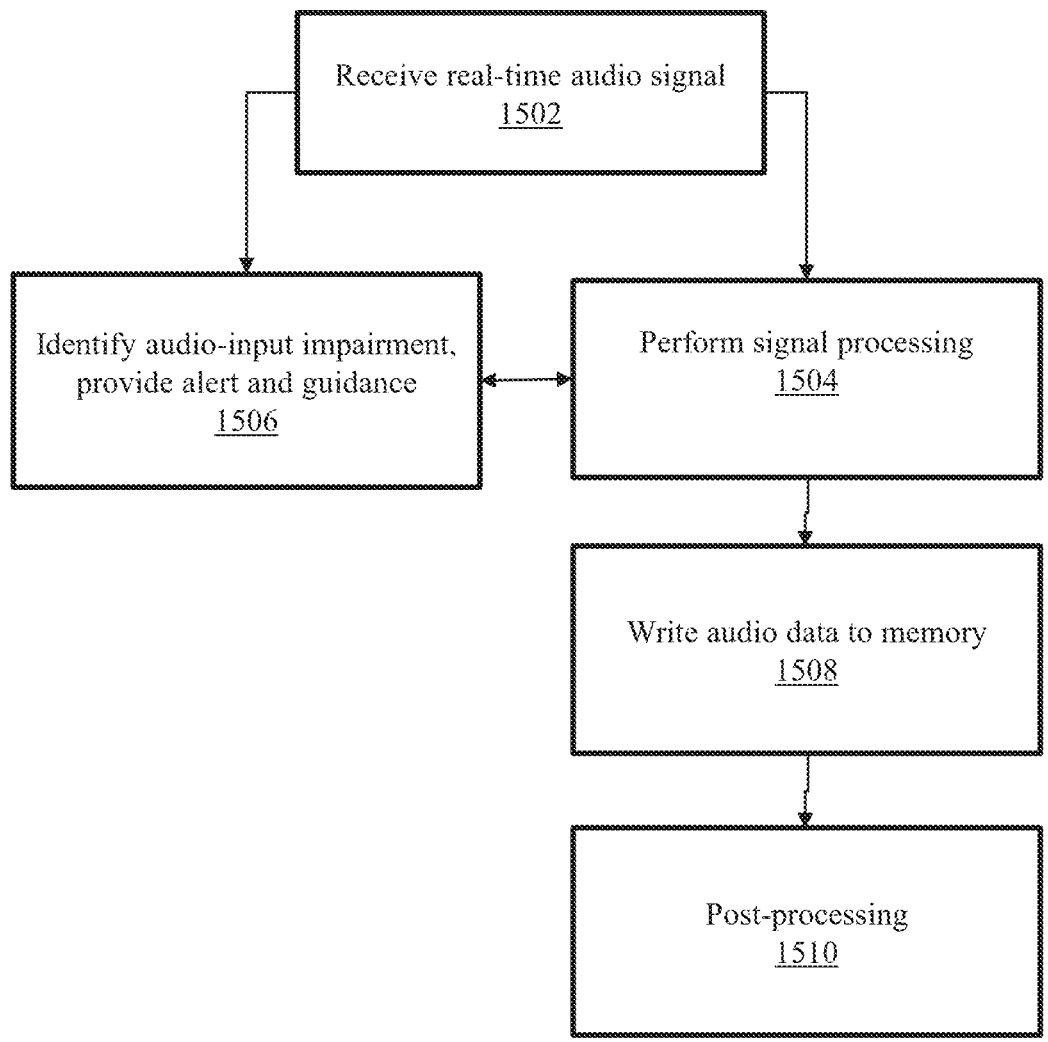
FIG. 15 illustrates a logic flow.

FIG. 15 shows an example of a logic flow 1500 for the portable electronic device as it receives and records audio input data. In the illustrated embodiment, the logic low 1500 may receive a real-time audio-input signal at block 1502. For example, the real-time audio-input signal 402 may be received during a recording operation, or while a digital assistant is listening for a command. The audio-input signal may be received from one or more microphones on the device.

The logic flow 1500 may perform signal processing at block 1504. Signal processing may include, for example and without limitation, echo cancellation, equalization, or noise suppression, or other operations to improve the perceived quality of the audio data.

The logic flow 1500 may identify one or more audio-input impairments, and generate feedback, guidance, or both at block 1506. An example of the operations of block 1506 is described with respect to FIG. 16. Block 1506 may be performed in parallel with, or independently of, block 1504, as shown. In the absence of any identified audio-input impairments, block 1506 may continuously perform signal analysis to detect audio-input impairments, but may not generate any guidance or feedback.

In some cases, an identified audio-input impairment may be provided to block 1504, which may affect which signal processing operations are performed, or may modify the operations of the performed operations. For example, when wind noise is detected, block 1504 may perform noise cancellation that may be specific to wind noise.

Alternatively, block 1506 may be performed sequentially, before or after block 1504. For example, block 1506 may receive a processed signal from block 1504 and may identify audio-input impairments in the processed signal rather than from raw data.

The logic flow 1500 may write the signal-processed audio data to memory at block 1508. The audio data may be written, i.e. stored, to a local memory on the portable electronic device, to a remote store, or both.

The logic flow 500 may perform optional post-processing at block 1510. For example, when post-recording adjustments are possible, as discussed above, the adjustments may be performed at this point.

Figure 16:
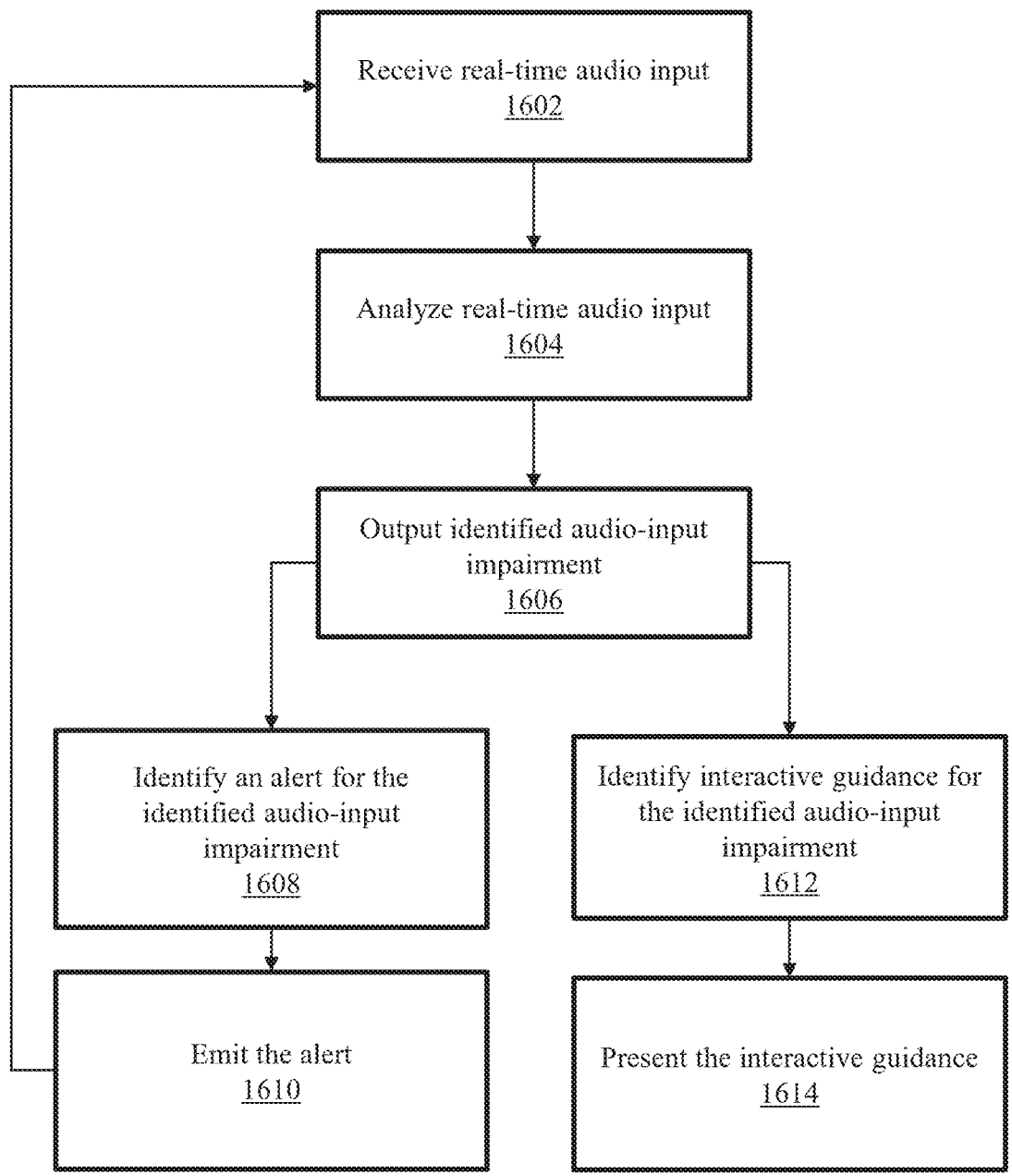
FIG. 16 illustrates a second logic flow.

FIG. 16 shows an example of a logic flow 1600 for the recording guidance system 400. The logic flow 1600 may be representative of some or all of the operations executed by one or more of the embodiments described herein, and in particular, of block 1506 in FIG. 15. The operations of the logic flow 1600 may be performed by the recording guidance system 400, for example, in real-time while audio data is being recorded on a portable electronic device. As used herein, "real-time" refers to performing operations while and as the audio data is being received at the electronic device from an audio source, so that the user has the opportunity to correct the impairments while they are happening. Real-time processing stands in contrast to post-processing of audio data, which involves performing operations after the data is received and stored.

In the illustrated embodiment, the logic flow 1600 may receive a real-time audio-input signal at block 1602. For example, the audio analytics module 410 may receive the real-time audio-input signal 402 during a recording operation, or while a digital assistant is listening for a command. The audio-input signal may be received from one or more microphones on the device and may be the electrical signal corresponding to a converted sound received at the one or more microphones from the environment.

The logic flow 1600 may analyze the audio-input signal at block 1604. For example, the audio analytics module 410 may provide the audio-input signal to its functional components as an input. The functional components, e.g., the detectors 512, 514, 516, 518 and 520, may analyze their respective input signals to determine whether an audio-input impairment is present. Each functional component may analyze and/or monitor a different aspect or measure of the input signal. For example, the microphone-occlusion detector 514 may compare the input levels of a plurality of microphones to identify if a microphone is blocked, while the speech-intelligibility detector 512 may analyze the input signal to detect human speech and then determine whether detected speech is intelligible.

The logic flow 1600 may output an identified audio-input impairment at block 1606. For example, one or more the functional components of the audio analytics module may identify an audio-input impairment as a result of their respective analyses. For example, the handling-noise detector 516 may detect noises in the input signal that correspond to user touches on the device, and may accordingly identify a handling-noise impairment. Note that if no audio-input impairments are detected during the analysis in block 1604, the remainder of the logic flow may be skipped until an audio-input impairment is identified. Block 1602 and 1604 may be performed continuously while audio input is received.

The logic flow 1600 may identify a user-perceptible alert corresponding to the audio-input impairment at block 1608. The audio analytics module may provide any identified impairments as one or more outputs to the impairment module. The impairment module may look up or otherwise identify one or more user-perceptible alerts associated with the identified impairment(s).

The logic flow 1600 may emit a user-perceptible alert at the block 1610. For example, the impairment module may output a user-perceptible alert such as a visual alert on a display, an audio alert through a speaker, or a haptic alert through an actuator. In some embodiments, when automatic correction is applied, a user-perceptible alert may be omitted.

The logic flow 1600 may identify interactive guidance for the identified audio-input impairment at block 1612. For example, the interactive user guidance module may receive the identified audio-input impairment(s) and may select guidance associated with the impairment.

The logic flow 1600 may present the interactive guidance at block 1614. For example, the interactive guidance may be presented visually on the display, or aurally via a speaker.

Although blocks 1608 and 1612 are shown in parallel, in some embodiments, the blocks may occur sequentially. Additionally, some of the blocks may be combined in one operation, for example, an alert and selected interactive guidance may be selected and/or presented to a user simultaneously.

The logic flow 1600 may repeat continuously throughout the duration of recording operation. While no audio-input impairments are identified, blocks 1606-1614 may be skipped.

VII. Other Exemplary Embodiments

The examples described above generally concern principles related to detecting impairments that may negatively affect an audio recording in real time, and guiding a user to addressing the impairments, and related systems and methods. The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, detectors for more, fewer, or other audio-input impairments may be used. Different methods of detecting the impairments may be used, e.g., different acoustic models, or different signal processors. Other forms of impairment alerting and interactive guidance may be used.

The functional components described herein may include logic, e.g., software instructions, hardware instructions, or a combination thereof, that, when executed by one or more processors, performs the operations described.

VIII. Computing Environments

Figure 17:
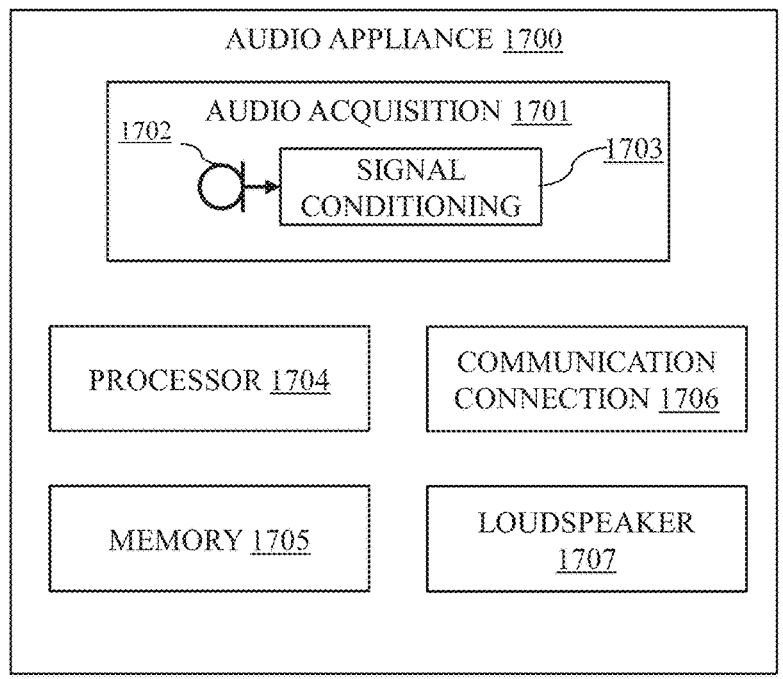
FIG. 17 illustrates a block diagram showing aspects of an audio appliance.

FIG. 17 shows an example of a suitable architecture for an audio appliance 1700 that can receive audio-input signals and prepare the signals for analysis by an audio input analyzer. The audio appliance 1700 includes an audio acquisition module 1701 and aspects of a computing environment (e.g., described more fully below in connection with FIG. 17) that can cause the appliance to respond to an acoustic scene in a defined manner, e.g., as described above in connection with detecting one or more impairments of such an acoustic scene and guiding a user to address such impairments.

As shown in FIG. 17, the audio acquisition module 1701 can include a microphone transducer 1702 and a signal conditioner 1703 to filter or otherwise condition the acquired representation of ambient sound. Some audio appliances have an analog microphone transducer and a pre-amplifier to condition the signal from the microphone.

For example, the illustrated appliance 1700 includes a processing unit 1704 and a memory 1705 that contains instructions the processing unit can execute to cause the audio appliance to, e.g., carry out one or more aspects of acquiring sound, extracting information from the acquired sound, analyze the acquired sound, identify audio-input impairments in the analyzed sound, and provide alerts and guidance corresponding to the identified impairment. For example, such instructions can cause the audio appliance 1700 to capture sound with the audio acquisition module 1701 and to separate an audio signal from background noise, communicate some or all of an acquired audio signal over a communication connection 1706 to a local or a remote speech-recognition system (not shown).

Referring still to FIG. 17, an audio appliance typically includes a microphone transducer to convert incident acoustic signals to corresponding electrical output. As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Typically, the electrical signal output by the microphone is an analog signal.

Although a single microphone is depicted in FIG. 17, the use of plural microphones is contemplated by this disclosure. For example, plural microphones can be used to obtain plural distinct acoustic signals emanating from a given acoustic scene, and the plural versions can be processed independently and/or combined with one or more other versions before further processing by the audio appliance 1700.

Output from the pre-amplifier or other conditioner can be low-pass filtered before being sampled by an analog-to-digital converter (ADC), though the output need not be low-pass filtered prior to sampling. In some instances, the ADC can employ Sigma-Delta modulation, followed by a decimation filter to down-sample the digital signal.

Referring to FIG. 17, for example, an analog output from the microphone transducer 1702 can be low-pass filtered and subsequently sampled at or above a Nyquist frequency (i.e., twice the highest frequency component in the underlying signal to be sampled) relative to a selected passband, e.g., having an upper-frequency threshold corresponding to human hearing, to generate a stream of acoustic data corresponding to the analog audio signal acquired by the microphone 1702. Assuming ambient sounds of interest have an upper threshold frequency of about 20 kHz, a sampling frequency above about 40 kHz can accurately capture an acoustic scene of interest.

Figure 18:
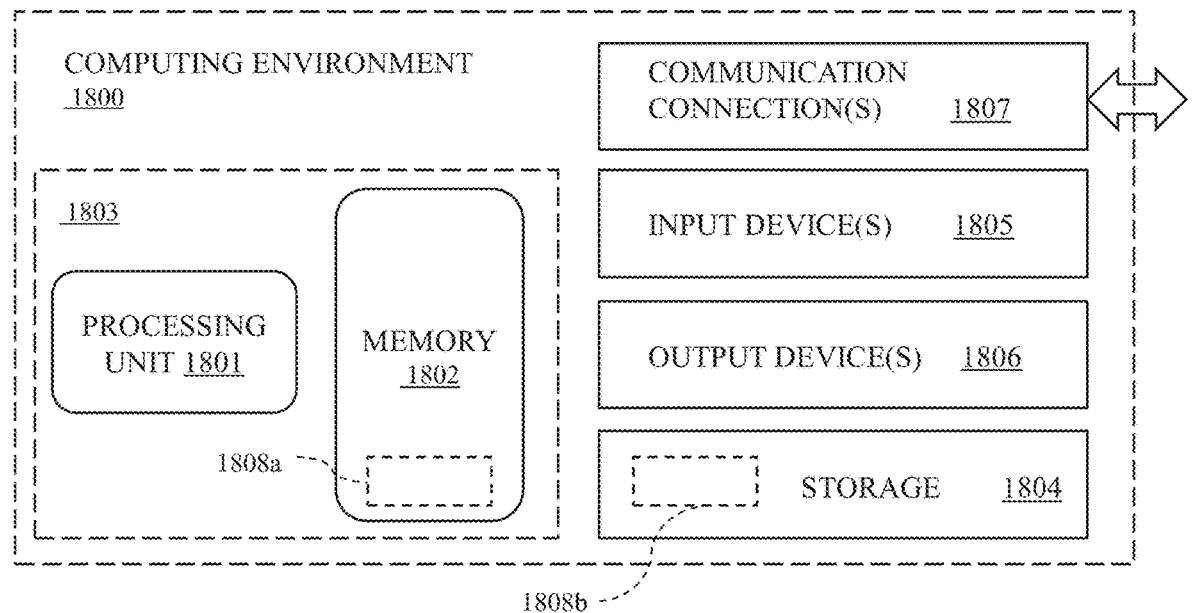
FIG. 18 illustrates a block diagram showing aspects of a computing environment.

FIG. 18 illustrates a generalized example of a suitable computing environment 1800 in which described methods, embodiments, techniques, and technologies relating, for example, to audio-input signal processing and correction on an appliance, e.g., a portable electronic device, can be implemented. The computing environment 1800 is not intended to suggest any limitation as to scope of use or functionality of the technologies disclosed herein, as each technology may be implemented in diverse general-purpose or special-purpose computing environments, including within an audio appliance. For example, each disclosed technology may be implemented with other computer system configurations, including wearable and/or handheld appliances (e.g., a mobile-communications device, such as, for example, IPHONE®/IPAD®/AIRPODS®/HOME-POD™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

As used herein, a module, or functional component, may be a programmed general-purpose computer, or may be software instructions, hardware instructions, or both, that are executable by one or more processing units to perform the operations described herein.

The computing environment 1800 includes at least one central processing unit 1801 and a memory 1802. In FIG. 18, this most basic configuration 1803 is included within a dashed line. The central processing unit 1801 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 1801 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 1802 may be volatile memory (e.g., registers, cache, RAM), non-volatile memory (e.g., ROM, EEPROM, flash memory, etc.), or some combination of the two. The memory 1802 stores instructions for software 1808a that can, for example, implement one or more of the technologies described herein, when executed by a processor. Disclosed technologies can be embodied in software, firmware or hardware (e.g., an ASIC).

A computing environment may have additional features. For example, the computing environment 1800 includes storage 1804, one or more input devices 1805, one or more output devices 1806, and one or more communication connections 1807. An interconnection mechanism (not shown)

such as a bus, a controller, or a network, can interconnect the components of the computing environment 1800. Typically, operating system software (not shown) provides an operating environment for other software executing in the computing environment 1800, and coordinates activities of the components of the computing environment 1800.

The store 1804 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 1800. The storage 1804 can store instructions for the software 1808b that can, for example, implement technologies described herein, when executed by a processor.

The store 1804 can also be distributed, e.g., over a network so that software instructions are stored and executed in a distributed fashion. In other embodiments, e.g., in which the store 1804, or a portion thereof, is embodied as an arrangement of hardwired logic structures, some (or all) of these operations can be performed by specific hardware components that contain the hardwired logic structures. The store 1804 can further be distributed, as between or among machine-readable media and selected arrangements of hardwired logic structures. Processing operations disclosed herein can be performed by any combination of programmed data processing components and hardwired circuit, or logic, components.

The input device(s) 1805 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 1800. For audio, the input device(s) 1805 may include a microphone or other transducer (e.g., a sound card or similar device that accepts audio input in analog or digital form), or a computer-readable media reader that provides audio samples and/or machine-readable transcriptions thereof to the computing environment 1800.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 1806 may be any one or more of a display, printer, loudspeaker transducer, DVD-writer, signal transmitter, or another device that provides output from the computing environment 1800. An output device can include or be embodied as a communication connection 1807.

The communication connection(s) 1807 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 1800. By way of example, and not limitation, with the computing environment 1800, machine-readable media include memory 1802, storage 1804, communication media (not shown), and combinations of any of the above. As used herein, the phrase "tangible machine-readable" (or "tangible computer-readable") media excludes transitory signals.

As explained above, some disclosed principles can be embodied in a store 1804. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, detecting, adjusting, sensing, measuring, filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hardwired, circuit components.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of principles related to detecting conditions that may negatively affect an audio recording in real time, and guiding a user to addressing the conditions, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of principles related to detecting conditions that may negatively affect an audio recording in real time, and guiding a user to addressing the conditions, and related methods and systems that can be devised under disclosed and claimed concepts.

Moreover, nothing disclosed herein is intended to be dedicated to the public regardless of whether such disclosure is explicitly recited in the claims. To aid the Patent Office and any readers of any patent issued on this application in interpreting the claims appended hereto or otherwise presented throughout prosecution of this or any continuing patent application, applicants wish to note that they do not intend any claimed feature to be construed under or otherwise to invoke the provisions of 35 USC 112(f), unless the phrase "means for" or "step for" is explicitly used in the particular claim.

IX. Privacy Statement

As described above, one aspect of the present technology is the gathering and use of data available from various sources to improve the quality of real-time recorded audio. The present disclosure contemplates that in some instances, this gathered data may include personal information data that uniquely identifies or can be used to contact or locate a specific person. Such personal information data can include demographic data, location-based data, telephone numbers, email addresses, social media ID's, home addresses, data or records relating to a user's health or level of fitness (e.g., vital signs measurements, medication information, exercise information), date of birth, voice print, or any other identifying or personal information.

The present disclosure recognizes that the use of such personal information data, in the present technology, can be used to the benefit of users. For example, the personal information data can be used to improve a specific recording experience, or in the aggregate, to improve acoustic models, device design, or other aspects of audio recording. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting metadata about recorded audio data and impairments identified therein, the present technology can be configured to allow users to select to "opt in" or "opt out" of participation in the collection of personal information data during registration for services or anytime thereafter. In another example, users can select not to provide the collected metadata and aggregate scores to the device manufacturer. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, impairments present in audio-input signals can be identified based on non-personal information data or a bare minimum amount of personal information, such as non-customized acoustic models or detection algorithms, depersonalized meta-data, other non-personal information available to the recording guidance system, or publicly available information.

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We currently claim:

1. An apparatus having a microphone transducer, a processor, and a memory containing instructions that, when executed by the processor, cause the apparatus to:
    initiate an audio recording responsive to a selected input;
    convert the sound received at the microphone transducer to an audio-input signal;
    determine, in real-time, a measure of perceptual sound quality for the audio-input signal relative to an expected perceptual sound quality that corresponds to an estimated distance of the apparatus from an intended audio source;
    in real-time, responsive to the measure of perceptual sound quality passing the expected perceptual sound quality, select a feedback mechanism from a plurality of feedback mechanisms;
    in real-time, output user-perceptible guidance corresponding to the selected feedback mechanism; and
    modify the user-perceptible guidance when the observed measure of perceptual sound quality changes by a predetermined measure.

2. The apparatus of claim 1, further comprising output means comprising at least one of a display, an audio output device, and a haptic actuator, wherein the instructions that, when executed by the processor, cause the apparatus to emit the user-perceptible alert comprise instructions that, when executed by the processor, cause the apparatus to emit the user-perceptible alert via the output means.

3. The apparatus of claim 1, the memory further comprising instructions that, when executed by the processor, cause the apparatus to detect an impairment in the audio-input signal in real-time when the measure of perceptual quality passes the corresponding threshold, wherein the detected impairment comprises one or more of poor-intelligibility, a microphone-occlusion, a handling-noise, a wind-noise, and distortion.

4. The apparatus according to claim 1, further comprising a camera, wherein the instructions, when executed by the processor, cause the apparatus to estimate the distance of the apparatus from the intended audio source based at least in part on an output from the camera.

5. The apparatus according to claim 4, wherein the selected feedback mechanism corresponds to a change in the distance of the apparatus from the intended audio source.

6. The apparatus according to claim 4, wherein the user-perceptible guidance comprises an instruction to move the apparatus closer to the intended audio source or an instruction to move the apparatus farther from the intended audio source.

7. An audio appliance, comprising:
    a microphone transducer configured to receive sound from an environment and to convert the received sound into an audio signal;
    a display;
    an audio analytics module configured to detect, in real-time, an impairment in perceptual sound quality of the audio signal compared to a lower threshold of acceptable sound quality based on an estimated distance of the audio appliance from an intended source of the received sound;
    an impairment module configured to emit a user-perceptible alert responsive to the detected impairment, in real-time; and
    an interactive guidance module configured to output, in real-time, user-perceptible guidance to move the audio appliance relative to the intended source when the perceptual sound quality falls below the lower threshold of acceptable sound quality.

8. The audio appliance of claim 7, wherein the impairment comprises unintelligible speech, wherein the user-perceptible guidance comprises one or more of a tactile, a visible, and an audible indication to move the electronic device closer to the intended source of the received sound.

9. The audio appliance of claim 7, wherein the impairment comprises an occluded or damaged microphone transducer and the user-perceptible guidance comprises one or more of a tactile, a visible, and an audible indication to remove an occlusion from the microphone transducer.

10. The audio appliance of claim 7, wherein the impairment comprises handling-noise and the user-perceptible guidance comprises one or more of a tactile, a visible, and an audible output indicating an action the user can take to reduce handling-noise.

11. The audio appliance of claim 7, wherein the impairment comprises wind-noise.

12. The audio appliance of claim 7, wherein the detected impairment comprises distortion and wherein the user-perceptible guidance comprises one or more of a tactile, a visible, and an audible indication to reduce an input audio level below a threshold audio level.

13. The audio appliance of claim 7, wherein the impairment module is further configured to select the user-perceptible alert, wherein the user-perceptible alert comprises one or more of a visual alert, an auditory alert, and a haptic alert.

14. The audio appliance according to claim 7, further comprising a camera module configured to estimate the distance of the audio appliance from the intended source of the received sound based at least in part on visual information received by the camera module.

15. The audio appliance according to claim 14, wherein the user-perceptible guidance comprises an instruction to move the audio appliance closer to the intended audio source until the perceptual quality exceeds a lower threshold of acceptable sound quality.

16. The audio appliance according to claim 14, wherein the user-perceptible guidance comprises an instruction to move the audio appliance farther from the intended audio source until the perceptual quality of the received sound exceeds a lower threshold of acceptable sound quality.

17. A method of recording audio, comprising:
receiving sound at an audio input device;
converting the sound to an audio-input signal;
detecting, while recording the audio-input signal to a media file, an impairment to perceptual sound quality of the audio-input signal relative to a threshold of acceptable sound quality corresponding to a distance from an intended source of the sound; and
presenting a user-perceptible output responsive to detection of the impairment, wherein the user-perceptible output is indicative of a user-implementable action to move the audio input device closer to or to move the audio input device farther away from the intended source of the sound.

18. The method of claim 17, wherein the user-perceptible output comprises at least one of a visual output, a tactile output, and an audible output.

19. The method of claim 17, further comprising modifying the user-perceptible output responsive to a detected change in the audio-input impairment.

20. The method according to claim 17, further comprising estimating a distance of the audio input device from the intended source based at least in part on visual information received by a camera.

21. The method according to claim 20, wherein the user-perceptible output comprises an instruction to move the audio input device closer to the intended source until the measure of perceptual sound quality exceeds a threshold of acceptable sound quality.

22. The method according to claim 20, wherein the user-perceptible guidance comprises an instruction to move the audio input device farther away from the intended audio source until the measure of perceptual sound quality exceeds a threshold of acceptable sound quality.

* * * * *